United States Patent [19]

Barton

[11] 3,999,766

[45] Dec. 28, 1976

[54] DYNAMOELECTRIC MACHINE SHAFT SEAL

[75] Inventor: Sterling C. Barton, Scotia, N.Y.

[73] Assignee: General Electric Company, Schenectady, N.Y.

[22] Filed: Nov. 28, 1975

[21] Appl. No.: 636,300

[52] U.S. Cl. .................................... 277/28; 277/71
[51] Int. Cl.² ........................................ F16J 15/40
[58] Field of Search ......... 277/3, 27, 28, 15, 70–75

[56] References Cited

UNITED STATES PATENTS 2,968,499   1/1961   Grobel ............................. 277/193

Primary Examiner—Robert I. Smith
Attorney, Agent, or Firm—James W. Mitchell; John F. Ahern

[57] ABSTRACT

In a gas-cooled dynamoelectric machine, sealing means are provided at each end of the machine to prevent the axial leakage of gas coolant out of the machine along the rotor surface. One type of known seal comprises an annular holder at each end of the machine, each holder having resiliently mounted therein a pair of sealing rings spaced apart in the axial direction to define an oil feed annulus therebetween. Seal oil is supplied to the oil feed annulus at a higher pressure than the gas coolant pressure thereby sealing the gas coolant into the machine. If the gas coolant design pressure is raised so must the seal oil pressure be raised which may ultimately cause the sealing ring adjacent the ambient side of the sealing means to bind against the holder in the radial direction. The present invention is directed toward maintaining the radial mobility of shaft seals, of the type described, against pressure increases between the sealing rings.

6 Claims, 1 Drawing Figure

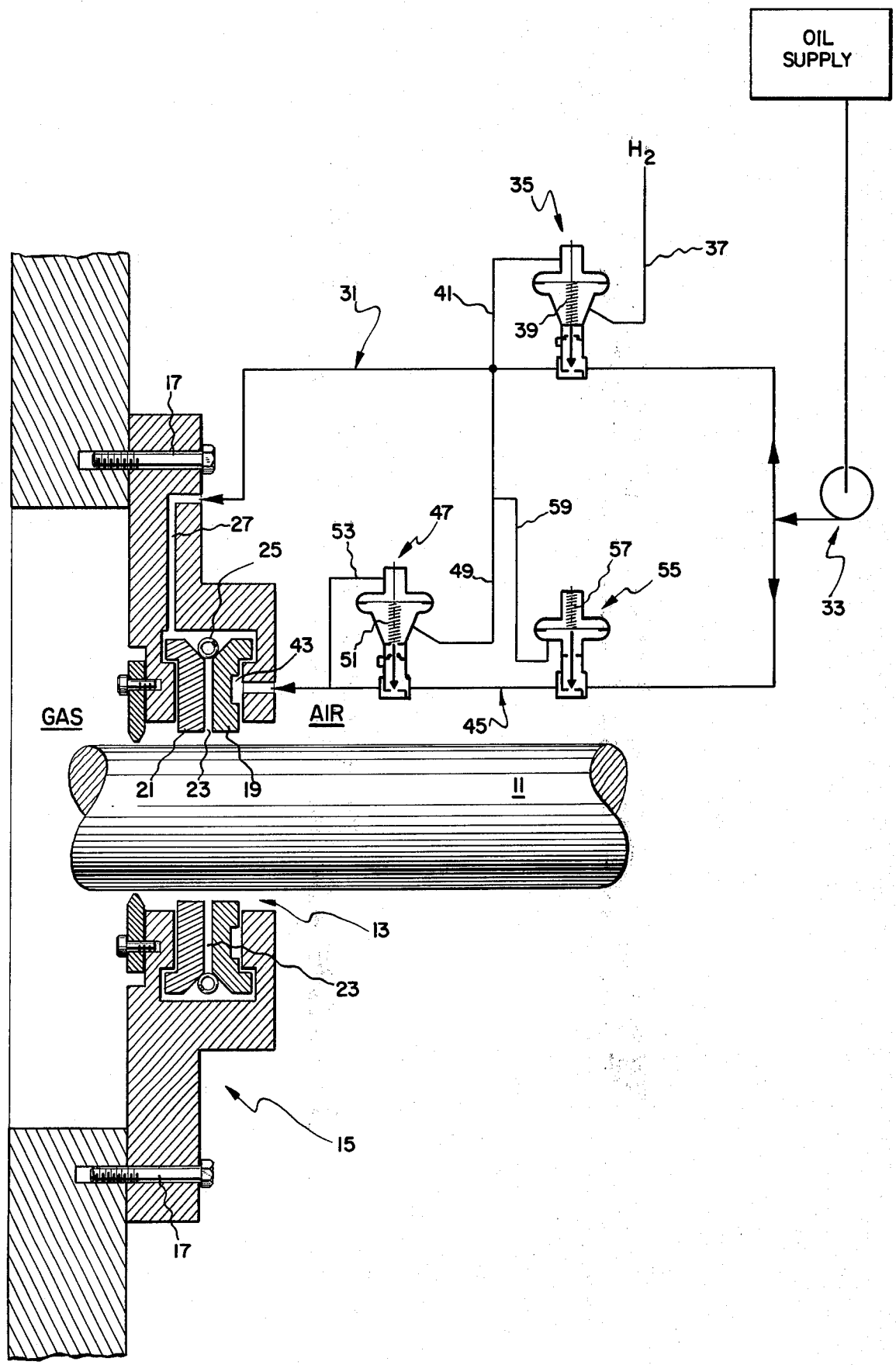

DYNAMOELECTRIC MACHINE SHAFT SEAL

BACKGROUND OF THE INVENTION

The present invention relates, in general to fluid sealing means disposed about the rotor of a gas-cooled dynamoelectric machine used to prevent axial leakage of gas coolant out of each end of the dynamoelectric machine along the rotor surface. The sealing means must provide a gas-tight seal and yet maintain a radial mobility upon the occurrence of a rotor-seal rub.

U.S. Pat. No. 2,647,771 to Grobel issued Aug. 4, 1953 gives a general description of the environment for which the present invention is intended. More particularly, the sealing means to which the present invention may be most advantageously applied comprises a pair of sealing rings which are resiliently mounted in an annular holder at each end of the dynamoelectric machine. The sealing means comprises a gas side sealing ring and an air side sealing ring which are axially apaced apart within each holder to define an oil feed annulus therebetween. The oil feed annulus is connected to a source of pressurized oil which distributes oil through the oil feed annulus to an annular gap between the radially inner surfaces of the rings and the surface of the rotor. The seal oil pressure is from 5 to 8 psi higher than the gas coolant pressure and hence the oil prevents the axial leakage of gas coolant out along the ends of the machine.

It may be desirable to increase the gas coolant pressure within the dynamoelectric machine in order to increase the cooling capacity of the machine. If the coolant gas pressure is increased, then the seal oil pressure must be proportionately increased in order not to destroy the effectiveness of the seal. The increase in seal oil pressure on the gas side ring makes little difference since the pressure increases on both sides of the gas side ring are substantially equal and hence the net axial force on the gas side ring remains the same. On the other hand, an increase in seal oil pressure on the air side ring (adjacent ambient pressure) results in an increase of the net force on the air side ring which, in effect, jams the ring against the annular holder causing a loss in radial mobility. In the event the rotor contacts the air side sealing ring and it is not free to move radially, the sealing ring or rotor could be permanently damaged.

It is therefore one object of the present invention to provide a rotor (shaft) seal at each end of a dynamoelectric machine which will retain radial mobility as machine gas pressures increase.

It is another object of the present invention to provide a rotor (shaft) seal at each end of a dynamoelectric machine having a means available for balancing seal oil pressure increases against the air side seal.

The novel features believed characteristic of the present invention are set forth in the appended claims. The invention itself, however, together with further objects and advantages thereof, may best be understood with reference to the following description taken in conjunction with the drawing.

BRIEF DESCRIPTION OF THE INVENTION

In a gas-cooled dynamoelectric machine, at each end thereof, an annular holder retains a sealing means comprising a pair of sealing rings depending radially inward toward the rotor surface. One sealing ring faces the gas coolant side of the machine and is called a gas side sealing ring whereas the other sealing ring faces the ambient end of the dynamoelectric machine and is noted as an air side sealing ring. The rings are axially spaced apart with respect to one another within the annular holder to define an oil feed annulus. The operation of the sealing means thus far decribed is as follows. Oil, at a pressure higher than the gas coolant is fed into the oil feed annulus whereupon it is distributed along the rotor surface toward both the air side and the gas side to from an annular fluid seal between the rotor surface and the radial inner surfaces of the sealing rings.

According to the present invention, an annular groove or chamber is formed in the air side sealing ring on the face opposite the oil feed annulus. An oil delivery conduit is placed in communication with the annular changer such that oil pressure at a level higher than the oil pressure in the oil feed annulus is delivered to the annular chamber to reduce the net axial force acting on the air side seal. In carrying out the invention, pressure differential control valve is used to regulate the pressure of the oil delivered to the annular changer and moveover a stop valve is included to ensure that the oil feed annulus is pressurized prior to the pressurization of the annular chamber.

BRIEF DESCRITPION OF THE DRAWING

The drawing is a cross-section elevation view of the annular holder and sealing means at one end of the dynamoelectric machine (not shown) including a hydraulic circuit for feeding the oil feed annulus and the annular chamber.

DETAILED DESCRIPTION OF THE INVENTION

The drawing is an elevation view in cross section, showing a dynamoelectric machine rotor portion 11 having a sealing means 13 mounted circumferentially about the rotor in an annular holder 15. Reference is again made to U.S. Pat. No. 2,647,771 issued Aug. 4, 1953 to Grobel for the purpose of illustrating the general environment of the sealing means. More particularly, in the Grobel patent, housing member 16 is circumferentially mounted about a dynamoelectric machine rotor for the purpoe of maintaining an annular seal about the rotor and said patent is incorporated into the present specification by the reference thereto. Accordingly, in the present invention, bolts 17 are provided for retaining the annular holder 15 substantially concentric with the dynamoelectric machine rotor when mounted in the dynamoelectric machine (not shown). It should be appreciated that a sealing means for only one end of the dynamoelectric machine is being illustrated.

The annular holder and sealing means partition each end of the dynamoelectric machine into an air side and a gas side as noted in the drawing. The gas side of the machine includes the rotor and stator core windings whereas the air side (so called, because it is at ambient pressure) includes the bearings at each end of the machine. The gas coolant usually employed in the dynamoelectric machine is hydrogen.

The sealing means 13 comprises a pair of sealing rings including an air side sealing ring 19 and a gas side sealing ring 21. These rings are usually made of a metallic material, as for example, bronze and may each comprise an upper half and a lower half relative to a horizontal centerline. The rings are retained within the annular holder 15 so that each ring possesses a radial mobility upon the occurrence of a rub between the rotor and the sealing rings. Moreover, the rings are axially spaced within the annular holder in order to define an oil annulus 23 therebetween. The details of construction of the sealing means and annular holder are well known in the art where it is known to apply at least one spring 25 to radially and axially position the sealing rings.

The manner of operation of the sealing means thus far described is as follows: Hydraulic fluid, usually oil, is supplied to the oil feed annulus 23 through an oil inlet conduit 27 in the annular holder. The oil feed annulus is in fluid communication with the rotor surface whereby the annular clearance between the sealing means and the rotor surface are supplied with hydraulic fluid to form a fluid seal. As will be further explained, the seal oil pressure is higher than the gas coolant pressure and the ambient pressure so that the oil flows along the rotor surface in both directions until it drains from the rotor surface. The seal oil pressure is maintained at a pressure level of from 5 to 8 psig higher than the gas coolant pressure level and this pressure differential remains substantially constant. As the gas coolant pressure level may be increased, the seal oil pressure in the oil feed annulus may also be increased to maintain the pressure differential. However, an increase in the seal oil pressure may adversely affect the radial mobility of the air side sealing ring since the ambient pressure on the face opposite the oil feed annulus remains constant. An increased oil pressure increases the net force acting on the air side sealing ring which may cause it to bind against the annular holder. To overcome the foregoing difficulty, the surface of the air side sealing ring opposite the oil feed annulus is supplied with pressurized fluid to offset the increase in fluid pressure in the oil feed annulus.

Pressurized fluid, normally oil but not limited thereto, is input into the oil feed annulus 23 through a first conduit 31 which interconnects an oil supply with the oil inlet conduit 27. Oil pressure is supplied by means of pump 33. The oil pressure is regulated in the first conduit by a first differential pressure control valve 35 having a reference pressure input 37 connected to the machine gas coolant ($H_2$). The first differential pressure control valve has a preset biasing force supplied by a spring 39 which is on the order of from 5 to 8 psig. Both the reference pressure input and the preset biasing force act in the valve opening direction, so that the feedback input on line 41 and the pressure in conduit 31 downstream from the first control valve, must exceed the reference pressure input by an amount equal to the biasing force in order to maintain a constant flow through the valve to the oil feed annulus. Moreover, as the gas coolant pressure is increased, the oil feed pressure will also increase downstream from the first control valve and also in the oil feed annulus.

In order to accommodate pressurized fluid to the air side sealing ring on the side opposite the oil feed annulus, the air side sealing ring is formed with an annular chamber 43. Oil is supplied to the annular chamber through a second conduit 45. A second differential pressure control valve 47 is used to regulate the pressure to the annular chamber 43 in the following manner. A reference pressure input 49 to the second differential pressure control valve is tapped off from the first conduit at a location downstream from the first differential pressure control valve. Spring 51, within valve 47 provides a differential biasing force which may be on the order of 30 psig. To balance the valve for constant flow, the feedback input on line 53 must be equal to the reference pressure input plus the biasing force input and hence, the pressure level supplied to the annular chamber will be considerably above that which is supplied to the oil feed annulus. However, taking into account the smaller surface area of the annular chamber 43 in relation to the larger surface area of the oil feed annulus portion defined by the air side sealing ring, it can be seen that the overall effect of the invention is to reduce the net force acting on the air side sealing ring. In addition, another advantage of the present invention is related to the manner in which the second differential pressure control valve follows the first differential pressure control valve so that the air side sealing ring will not be axially displaced if the pressure in the first conduit should fail.

Finally, in order to further ensure against pressurizing the annular chamber 43 prior to the pressurizing of the oil feed annulus 23 which may cause axial displacement of the air side sealing ring, a stop valve 55 is provided upstream from the second differential pressure control valve. The stop valve is biased in the closed position by means of spring 57 which may provide any preset desirable closing force, e.g., 60 psig. The stop valve is opened by means of line 59 which is connected into the first conduit and hence a minimum pressure must be reached in the first conduit and oil feed annulus before the stop valve will pass fluid to the annular chamber 43.

While there has been shown what is considered to be the preferred embodiment of the present invention, other modifications may occur to those skilled in the art. For example, other equivalent fluids and coolant gases may be employed besides hydrogen and oil; or, other equivalent flow regulating means may be employed for respective flow-pressure regulation in the first and second conduits. It is intended to cover in the appended claims all such modifications as fall within the true spirit and scope of the invention.

What is claimed is:

1. A gas-cooled dynamoelectric machine including a rotor extending through the dynamoelectric machine and out each end thereof; sealing means at each end of the dynamoelectric machine for preventing the escape of gas out of the dynamoelectric machine along the rotor at each end thereof; an annular holder at each end of the dynamoelectric machine, said holder being substantially concentric with the rotor and axially positioning each sealing means, each sealing means further comprising:

a gas side sealing ring depending radially inwardly from each annular holder toward said rotor;

an air side sealing ring depending radially inwardly from each annular holder toward said rotor; said sealing rings radially slidable within each holder and spaced apart in the axial direction to define an oil feed annulus therebetween;

an annular chamber formed in said air side sealing ring on the face opposite the oil feed annulus; and, means for delivering oil to said oil feed annulus and said annular chamber; said oil pressure in said oil feed annulus being greater than said machine gas coolant pressure and said oil pressure in said annular chamber being greater than said oil pressure in said oil feed annulus.

2. The dynamoelectric machine recited in claim 1 wherein the means for delivering oil comprise:

an oil source;
a first conduit interconnecting the oil source with said oil feed annulus;
a first differential pressure control valve disposed in said first conduit having a reference pressure input taken from said machine gas coolant and a feedback pressure input taken from said first conduit;
a second conduit interconnecting the pressurized oil source with said annular chamber; and,
a second differential pressure control valve disposed in said second conduit having a reference pressure input taken from said first conduit downstream from said first valve and a feedback pressure input taken from said second conduit downstream from said second control valve.

3. The dynamoelectric machine recited in claim 2 wherein each differential pressure control valve includes means for biasing the valve in the same direction as the reference pressure input whereby each feedback pressure input must be higher than its respective reference pressure input.

4. The dynamoelectric machine recited in claim 2 further comprising:
a stop valve disposed in said second conduit upstream from said second differential pressure control valve;
means applying a predetermined closing force on said stop valve; and
a conduit interconnecting the stop valve with the downstream side of said first differential pressure control valve whereby said stop valve will open when the pressure on the downstream side of said first control valve exceeds the predetermined closing force.

5. A gas-cooled dynamoelectric machine including a rotor extending through the dynamoelectric machine and out each end thereof; sealing means at each end of the dynamoelectric machine for preventing the axial leakage of gas coolant out of the machine ends; an annular holder at each end of the machine for supporting said sealing means; and each sealing means further comprising:
a gas side sealing ring depending radially inwardly from each holder toward said rotor;
an air side sealing ring depending radially inwardly from each holder toward said rotor; said sealing rings being radially slidable within each holder and spaced apart in the axial direction to define an oil feed annulus therebetween;
an annular chamber formed in said air side sealing ring on the side opposite the oil feed annulus;
means for delivering pressurized oil to said oil feed annulus and said annular chamber; said delivery means including first and second conduits, each connected at one end to a pressurized oil source; said first conduit being in fluid communication at its other end with said oil feed annulus and, said second conduit being in fluid communication at its other end with said annular chamber; and,
a control valve in each conduit whereby the oil pressure in said oil feed annulus and said annular chamber may be controlled at predetermined pressure levels.

6. The dynamoelectric machine recited in claim 5 further including a stop valve in said second conduit upstream from said control valve, said stop valve being held closed until said oil feed annulus is pressurized.

* * * * *